United States Patent [19]

Kubo et al.

[11] 4,098,143
[45] Jul. 4, 1978

[54] BREATHING SYSTEM FOR AN AUTOMATIC TRANSMISSION

[75] Inventors: Seitoku Kubo; Kojiro Kuramochi; Yoshio Shindo, all of Toyota, Japan

[73] Assignee: Toyota Jidosha Kogyo Kabushiki Kaisha, Japan

[21] Appl. No.: 827,706

[22] Filed: Aug. 25, 1977

[30] Foreign Application Priority Data

Apr. 28, 1977 [JP] Japan .................. 52-49444

[51] Int. Cl.² .................. F16H 57/02; B60K 17/02
[52] U.S. Cl. .................. 74/606 R; 74/740
[58] Field of Search .................. 74/606 R, 740, 750 R, 74/730, 606 A; 60/336, 337

[56] References Cited

U.S. PATENT DOCUMENTS

| 3,186,374 | 6/1965 | Heider | 74/606 |
| 3,214,989 | 11/1965 | Wellauer et al. | 74/606 |
| 3,533,307 | 10/1970 | Gunderson | 74/740 |

*Primary Examiner*—Allan D. Herrmann
*Assistant Examiner*—Jim Yates
*Attorney, Agent, or Firm*—Stevens, Davis, Miller & Mosher

[57] ABSTRACT

A breathing system for an automatic transmission including a fluid torque converter, an oil pump, an overdrive means and an auxiliary gear means each having its own housing and being air-tightly connected with each other in series in said order, the system including a passage extending through the housings of the oil pump, the overdrive means and the auxiliary gear means for releasing the internal space confined in the assembly of the housings to the atmosphere, the passage including a loop portion at a middle portion thereof including two parallel passages, one being located at a lower gravity potential level than the other.

6 Claims, 5 Drawing Figures

BREATHING SYSTEM FOR AN AUTOMATIC TRANSMISSION

BACKGROUND OF THE INVENTION

The present invention generally relates to an automatic transmission for automobiles, and, more particularly, to a breathing system therefor.

An automatic transmission for automobiles generally comprises a fluid torque converter, an oil pump, and an auxiliary gear means performing as a speed change gear mechanism, these structural elements having individual own housings which are air-tightly connected with each other thereby defining a closed space therein. This closed space is filled with air as well as oil serving as the working fluid of the fluid torque converter and as lubricant for the gear mechanism of the auxiliary gear means and other mechanical moving elements. The pressure in said closed space changes to a great extent in accordance with the temperature of the fluid existing in the space, dynamic pressure generated by the rotation of rotary elements contained in the assembly of the housings, etc. Therefore, such a housing assembly requires a breathing system for releasing said closed space to the atmosphere. In a conventional automatic transmission having housings of an oil pump and an auxiliary gear means joined in contact with each other, the breathing system for the housing assembly is formed as including a breathing passage formed in the housing of the oil pump and a second breathing passage formed in the housing of the auxiliary gear means, wherein one end of said second breathing passage is connected with the first-mentioned breathing passage while the other end of said second passage is opened to the atmosphere. In this case, the breathing system composed of the two breathing passages is constructed so that the breathing passage extends from its inner end provided at a wall of the oil pump housing and opening toward the inner space to its outer end provided at a wall of the housing of the auxiliary gear means and opening toward the atmosphere in a manner of increasing its gravity potential to a relatively large extent when compared with the length of the breathing passage. Because of this arrangement in the conventional breathing system, even if oil enters into the breathing passge from said inner end, it is returned to the inner space from a middle portion of the passage due to the effect of gravity. Therefore, in conventional automatic transmissions, a problem such as oil leaking out from the outer end of the breathing passage has not been encountered.

However, when an automatic transmission incorporates an overdrive means therein which, in view of the required strength of gears, the required capacity of friction engaging elements, etc., is positioned between a fluid torque converter and an auxiliary gear means so as to accelerate rotating power which is not yet effected a torque increase by the auxiliary gear means, i.e., when an automatic transmission comprises a fluid torque conveter, an oil pump, an overdrive means and an auxiliary gear means assembled in series in said order, the housings of the oil pump and the auxiliary gear means are positioned apart from each other with interposition of the housing of the overdrive means therebetween, thereby making it difficult to construct a breathing system of the aforementioned conventional kind which has a simple structure and yet is free from any danger of causing oil leakage. In this case, it may be contemplated to provide a third breathing passage formed in the housing of the overdrive means so that the first breathing passage formed in the housing of the oil pump is connected with the second breathing passage formed in the housing of the auxiliary gear means by way of said third breathing passage. However, such a breathing system will include a relatively thin and long passage extending through the housing of the overdrive means, because the housing of the overdrive means is generally a relatively thin cylindrical housing which only allows a relatively small bore to be formed actually through the wall thickness thereof. Therefore, a breathing system which is laid out to include a passage portion which actually traverses the housing of the overdrive means necessarily becomes a long narrow passage system. On the other hand, an automatic transmission for automobiles is gnenerally positioned to rearwardly incline from its front end connected with the engine towards its rear end connected with a propeller shaft. Therefore, the breathing passage formed in the housing of the overdrive means so as to penetrate it, in its axial direction, is automatically inclined downward from its front end toward its rear end. If such a downwardly inclined narrow passage portion is included in the breathing passage system, oil which has entered into the inclined passage portion from its front end automatically flows toward the rear end portion where it stagnates. As a result, the breathing passage is filled with oil thereby losing its breathing function and finally causing leakage of oil therethrough.

SUMMARY OF THE INVENTION

It is therefore the object of the present invention to provide an improved breathing system free from the danger of causing oil leakage from the housing of an automatic transmission which comprises a fluid torque converter, an oil pump, an overdrive means and an auxiliary gear means each having its own housing and being air-tightly connected with each other in series in said order.

In accordance with the present invention, a breathing system for an automatic transmission of the above mentioned type comrprises a first breathing passage formed in the housing of said oil pump, a second breathing passage formed in the housing of said overdrive means and having one end connected with said first breathing passage, a third breathing passage formed in the housing of said auxiliary gear means and having one end connected with said second breathing passage and the other end open to the atmosphere, a fourth breathing passage formed in either or both of the housings of said overdrive means and said auxiliary gear means and having one end connected with the joining region of said second and third breathing passages and extending substantially downward from said one end towards the other end thereof, and a fifth breathing passage formed in the housing of said overdrive means and having one end connected with said other end of said fourth breathing passage and the other end connected with said first breathing passage, said fifth breathing passage being positioned to be substantially lower than said second breathing passage.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
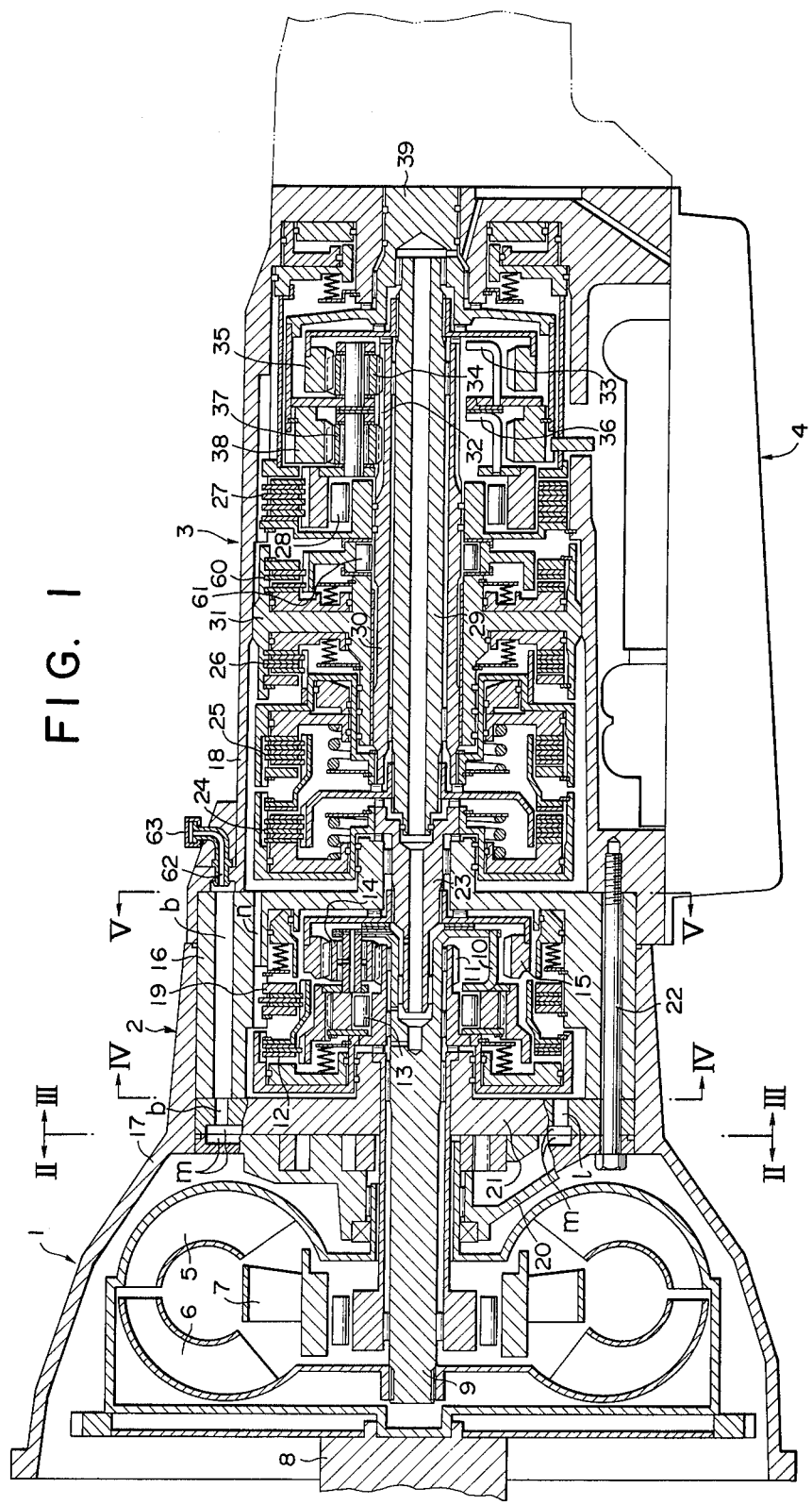
FIG. 1 is a cross-sectional view of an automatic transmission incorporating an embodiment of the breathing system of the present invention.
Figure 2:
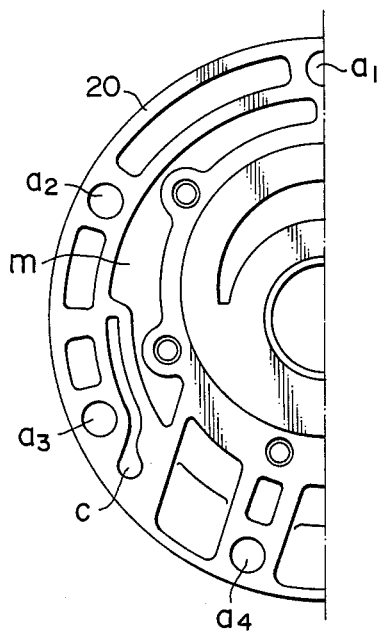
FIGS. 2, 3, 4, and 5 are end views taken along lines II — II, III — III, IV — IV, and V — V in FIG. 1.
Figure 3:
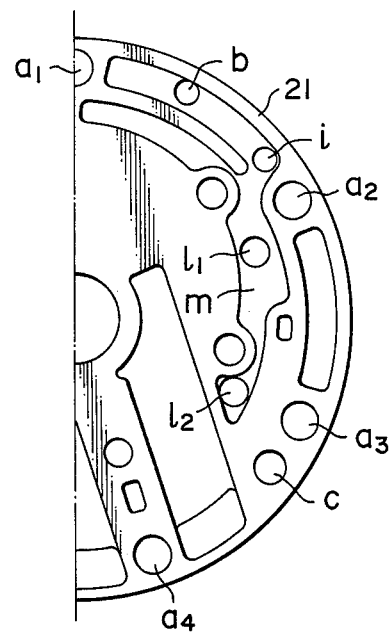
Figure 4:
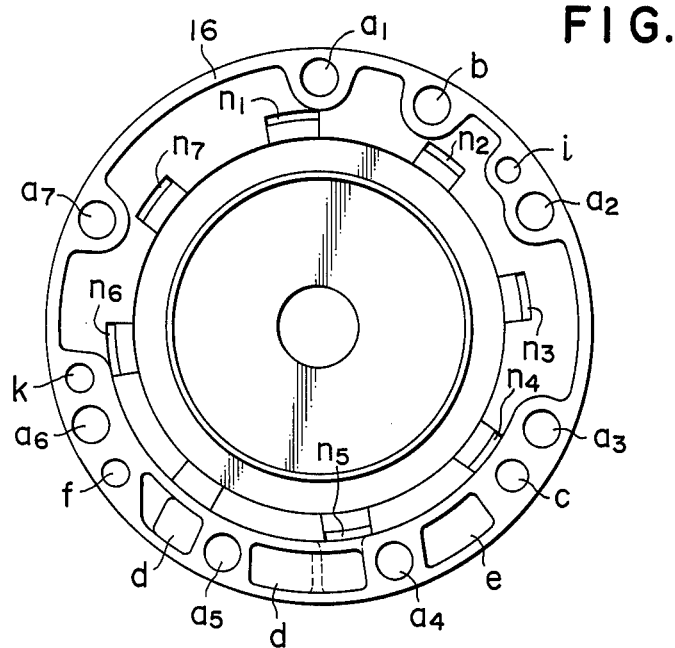
Figure 5:
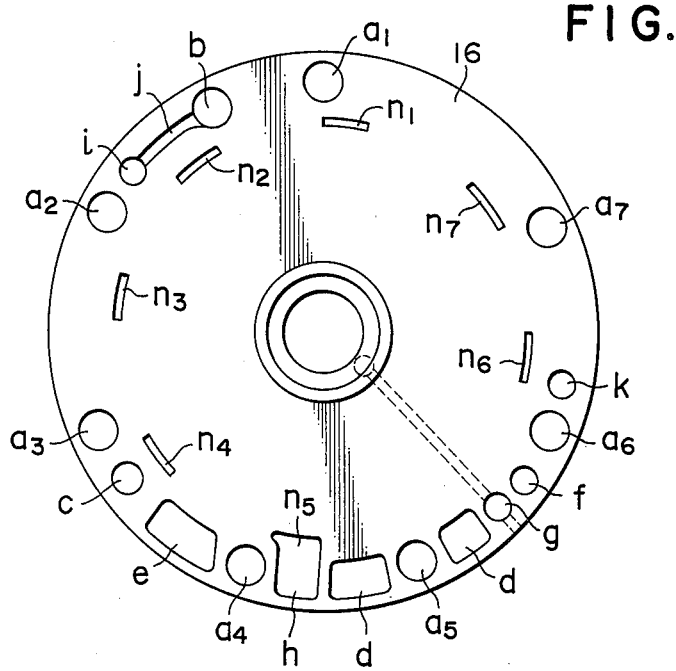

Referring to FIG. 1, an automatic transmission hereinshown comprises a fluid torque converter 1, an overdrive means 2, an auxiliary reduction gear means 3 for effecting three forward speed stages and one rearward speed stage and an oil pressure control means 4. The fluid torque converter 1 is of a conventional well-known type including a pump impeller 5, a turbine 6 and a stator 7. The pump impeller 5 is connected with a crankshaft 8 of an engine (not shown) while the turbine 6 is connected with a turbine shaft 9 which forms an output shaft of the fluid torque converter. This output shaft also provides an input shaft of the overdrive means 2, wherein the input shaft is connected with a carrier 10 of a planetary gear mechanism incorporated in the overdrive means. The carrier 10 rotatably supports a plurality of planetary pinions 14 which in turn are engaged with a sun gear 11 and a ring gear 15. A multi-disc clutch 12 and a one-way clutch 13 are provided between the sun gear 11 and the carrier 10 and, furthermore, a multi-disc brake 19 is provided between the sun gear 11 and an overdrive housing or case 16 enclosing the overdrive means or the planetary gear mechanism. The fluid torque converter 1 has a housing 17 which encloses therein the pump impeller 5, the turbine 6 and the stator 7. The auxiliary gear means 3 has a housing or transmission case 18 which encloses therein planetary gear mechanisms, clutches and brakes such as mentioned below. These housings 17 and 18 are joined together by connecting bolts not shown in the figure An oil pump is incorporated in a pump body formed by housing means 20 and 21. The overdrive case 16 and the oil pump housing 20, 21 are fastened to the transmission case 18 by bolts 22, one of which is shown in the figure.

In assembling the transmission, the overdrive case 16 and the oil pump body means 20, 21 are first fastened to the transmission case 18 by the bolts 22 and then the torque converter housing 17 is assembled thereon and joined with the transmission case 18 by the aforementioned bolts (not shown).

The ring gear 15 of the overdrive means 2 is connected with an input shaft 23 of the auxiliary gear means 3. A multi-disc clutch 24 is provided between the input shaft 23 and an intermediate shaft 29 while a multi-disc clutch 25 is provided between the input shaft 23 and a sun gear shaft 30. A multi-disc brake 26 is provided between the sun gear shaft 30 and a support 31 fixed to the transmission case 18. The sun gear shaft 30 has a sun gear 32 integrally formed therein, said sun gear meshing with a pluraltiy of first planetary pinions 34 (only one is shown) which mesh in turn with a ring gear 35 supported by a carrier 33 thereby forming a first set of planetary gear mechanism, while the sun gear 32 also meshes with a plurality of second planetary pinions 37 (one is shown) which mesh in turn with a ring gear 38 suported by a carrier 36, thereby forming a second set of planetary gear mechanism. The ring gear 35 of said first planetary gear mechansim is connected with the intermediate shaft 29, while the carrier 33 thereof is connected with the ring gear 38 of said second planetary gear mechanism. The combination of the carrier 33 and the ring gear 38 is connected with an output shaft 39. A multi-disc brake 27 and a one-way clutch 28 are provided between the carrier 36 of said second planetary gear mechanism and the transmission case 18.

The oil pressure control means 4 positioned below the auxiliary gear means 3 includes various change-over valve means (not shown) and is adapted to control the supply of oil pressure to the aforementioned clutches and brakes in order to accomplish various shift conditions among four foward speed stages including an overdrive stage and one rearward drive stage in accordance with the operation of a manual shift valve (not shown) and/or the balance between the engine output shaft and the vehicle speed. 61 designates a one-way clutch which selectively locks the sun gear shaft 30 when a brake 60 is engaged.

Table 1 shows the operating conditions of the clutches and brakes in various shift conditions.

TABLE 1

| FRICTION ENGAGING MEANS SHIFT POSITION | Clutch 12 | Clutch 24 | Clutch 25 | Brake 19 | Brake 26 | Brake 27 | One-Way Clutch 13 | One-Way Clutch 28 | One-Way Clutch 61 | Brake 60 |
|---|---|---|---|---|---|---|---|---|---|---|
| PARKING | O | X | X | X | X | O | — | — | — | X |
| REVERSE | O | X | O | X | X | O | Lock | Lock | Overrun | X |
| NEUTRAL | O | X | X | X | X | X | — | — | — | X |
| FORWARD | | | | | | | | | | |
| D RANGE | | | | | | | | | | |
| 1st Speed | O | O | X | X | X | X | Lock | Lock | * Lock | X |
| 2nd Speed | O | O | X | X | O | X | Lock | Overrun | Lock | O |
| 3rd Speed | O | O | O | X | X | X | Lock | Overrun | Overrun | O |
| O.D. | X | O | O | O | X | X | Overrun | Overrun | Overrun | O |
| 2 RANGE | | | | | | | | | | |
| 1st Speed | O | O | X | X | X | X | Lock | Lock | * Lock | X |
| 2nd Speed | O | O | X | X | O | X | Lock | Overrun | Lock | O |
| L RANGE | O | O | X | X | X | O | Lock | Lock | Overrun | X |

Wherein O shows that the clutch or brake is engaged; X shows that the clutch or brake is disengaged; and * shows that the clutch or brake is not transmitting power.

Now, FIGS. 2, 3, 4, and 5 are end views of the housings of the oil pump and the overdrive means. These housings are formed with bores for through bolts and bores and grooves for conducting oil which are aligned or overlapped with each other. In FIGS. 2 - 5, bores and grooves corresponding to each other are designated by the same alphabetic reference notes or combinations of alphabetic characters and numerals. In these figures, $a1 - a7$ are bores extending through the pump housings 20 and 21 and the overdrive housing 16 for passing the bolts 22 therethrough for clamping the pump housings and the overdrive housing to the housing 18 of the auxiliary gear means. The pump housings 20 and 21 are provided with grooves $m$ formed along their joining surfaces thereby providing a breathing passage within the housing of the oil pump. This breathing passage is connected with the internal space chamber of the transmission housing by way of breathing bores $l1$ and $l2$ which axially penetrate the pump housing 21. The pump housing 21 is further formed with a breathing bore $b$ which is connected with the groove $m$ at one end thereof and axially extends through the body of the pump housing. Corresponding to the breathing bore $b$ is provided a breathing bore $b$ in the overdrive housing 16 so as to traverse axially a thickened part of the peripheral wall thereof. One end of the breathing passage $b$ formed in the overdrive housing is connected with the breathing bore b formed in the pump housing, while the other end of the breathing passage $b$ is connected with one end of a breathing passage 62 formed in the housing 18 of the auxiliary gear means. The other end of the breathing passage 62 is opened to the atmosphere through a filter cap 63 mounted at the open port.

The pump housing 21 is further provided with another breathing bore $i$ which is connected with the groove $m$ at a position located below the breathing bore $b$ and extends to traverse axially the body thereof. Corresponding to the breathing bore $i$, the overdrive housing 16 is also provided with another breathing passage $i$ which extends axially through a thickened portion of the peripheral wall of the overdrive housing. As particularly shown in FIG. 5, breathing bores $b$ and $i$ formed in the overdrive housing are connected with each other by way of groove $j$ formed along the rear end surface of the overdrive housing.

As apparent from the foregoing explanation. The breathing system of the present invention is arranged to have such a passage system as summarized hereinbelow. The close space chamber confined in the housing of the automatic transmission is breathingly released through the breathing bores $l1$ and $l2$ to the breathing passage $m$ formed in the pump housing 20, 21, wherefrom it is further released through the breathing bore $b$ formed in the pump housing 21 to the breathing passage $b$ formed in the overdrive housing 16, wherefrom it is further released through the breathing passage 62 formed in the housing 18 of the auxiliary gear means to the atmosphere. In addition to the aforementioned main breathing passage system, another passage system is provided so as to extend from the joining portion of the breathing passage $b$ formed in the overdrive housing and the breathing passage 62 formed in the auxiliary gear housing 18 through the groove $j$, the breathing passage $i$ formed in the overdrive housing and the breathing bore $i$ formed in the pump housing 21 to the breathing groove $m$ formed in the pump housing. By this arrangement, two passage systems including two breathing passges $b$ and $i$ having different gravity potentials are established between the breathing groove $m$ formed in the pump housing and the entrance of the breathing passage 62 formed in the auxiliary gear housing. By the provision of this loop passage having two parallel portions of different gravity potentials, if oil enters into this passage system, the oil is circulated through the loop passage system due to gravity potential, thereby positively avoiding that the oil which has entered into the breathing system further flows into the breathing passage 62 so as to be urged therethrough to leak out of the transmission housing.

In this manner, the present invention provides a breathing system which includes a breathing passage which axially traverses the overdrive housing having a relatively long axial length and yet is positively relieved from a stagnation of oil being caused therein, wherein such an improved breathing system is obtained by a very simple structure of incorporating a loop passage system having two parallel passages of different gravity potentials at a middle portion of the breathing system.

Explaining other bores or opening shown in FIGS. 2 – 5, the bore $c$ is an oil supply passage for the fluid torque converter; the bore $k$ is an exhaust passage from the torque converter; the bore $d$ is an intake passage for the oil pump; the bore $e$ is a delivery passage from the oil pump; the bore $f$ is a passage for conducting oil pressure to the clutch 12 when the overdrive means is set in direct connecting condition; the bore $g$ is a passage for conducting oil pressure to the clutch 24 which is engged in forward speed stages; the bore $h$ is an exhaust passage for the overdrive means and is defined by a side wall means provided at a portion of the intake passage $d$ for the oil pump and is located at the lowest portion of the overdrive housing 16; and the bores $n1$ – $n7$ are through bores for communicating internal spaces of the overdrive housing and the auxiliary gear housing.

Although the invention has been shown and described with respect to a preferred embodiment thereof, it should be understood by those skilled in the art that various changes and omissions of the form and detail thereof may be made therein without departing from the scope of the invention.

We claim:

1. A breathing system for an automatic transmission which comprises a fluid torque converter, an oil pump, an overdrive means and an auxiliary gear means each having its own housing and being air-tightly connected with each other in series in said order, said system comprising a first breathing passage formed in the housing of said oil pump, a second breathing passage formed in the housing of said overdrive means and having one end connected with said first breathing passage, a third breathing passage formed in the housing of said auxiliary gear means and having one end connected with said second breathing passage and the other end opened to the atmosphere, a fourth breathing passage formed in either or both of the housings of said overdrive means and said auxiliary gear means and having one end connected with the joining region of said second and third breathing passages and extending substantially downward from said one end towards the other end thereof, and a fifth breathing passage formed in the housing of said overdrive means and having one end connected with said other end of said fourth breathing passage and the other end connected with said first breathing passage, said fifth breathing passage being positioned to be substantially lower than said second breathing passage.

2. The breathing system of claim 1, wherein the housing of said overdrive means includes a substantially cylindrical wall portion having first and second thickened portions extending in its axial direction, said second breathing passage being formed through said first thickened portion while said fifth breathing passage is formed through said second thickened portion.

3. The system of claim 2, wherein said first thickened portion and said second breathing passage formed therein are located at a higher gravity potential level than said second thickened portion and said fifth breathing passage formed therein.

4. The system of claim 1, wherein the housing of said oil pump includes first and second axially joined disc-like elements having co-operating joining surfaces, said first disc-like element having a first groove formed along said joining surface and including a substantially vertical portion, said second disc-like element having a second groove formed along said joining surface and including a substantially vertical portion, said substantially vertical portions of said first and second grooves opposing with each other thereby defining said first breathing passage, said second disc-like element further having a first axial through bore connected with said second groove and defining a part of said second breathing passage and a second axial through bore connected with said second groove and defining a part of said fifth breathing passage.

5. The system of claim 1, wherein the housing of said overdrive means includes a disc-like rear end wall portion, said second and fifth breathing passages opening through said disc-like rear wall portion defining opening ports therein, said fourth breathing passage being formed in said disc-like rear wall portion as a groove along the rear surface thereof to bridge said opening ports.

6. The system of claim 4, wherein the housing of said overdrive means has a substantially cylindrical wall portion and a disc-like rear end wall portion, said substantially cylindrical wall portion having first and second thickened portions extending in the axial direction thereof, said second breathing passage being formed through said first thickened portion and said disc-like rear end wall portion so as to open at the rear end surface of said disc-like rear end wall portion, said fifth breathing passage being formed through said second thickened portion and said disc-like rear end wall portion so as to open at the rear end surface of said disc-like rear end wall portion, said second breathing passage formed in said first thickened portion being connected with said first axial through bore formed in said second disc-like element of said oil pump housing, said fifth breathing passage formed in said second thickened portion being connected with said second axial through bore formed in said second disc-like element of said oil pump housing, said first thickened portion and said second breathing passage formed therein being located at a higher gravity potential level than said second thickened portion and said fifth breathing passage formed therein, said fourth breathing passage being formed as a groove formed in said disc-like rear wall portion of said overdrive housing along the rear wall surface thereof so as to connect end portions of said second and fifth breathing passages.

* * * * *